Oct. 28, 1969     M. M. GITLIN ET AL     3,475,083
SPECTACLE FRAME HAVING DETACHABLE LENSES
AND INWARDLY CURVED TEMPLES
Filed July 27, 1965     2 Sheets-Sheet 1
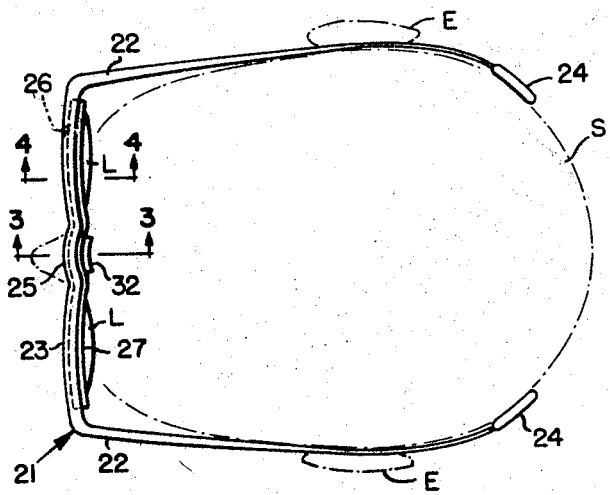
FIG. 1
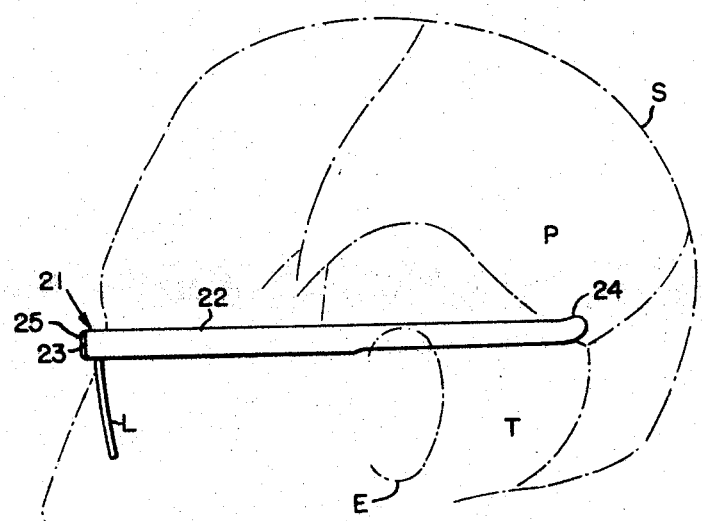
FIG. 2
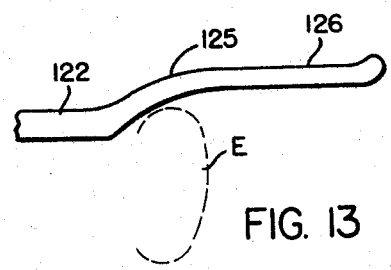
FIG. 13
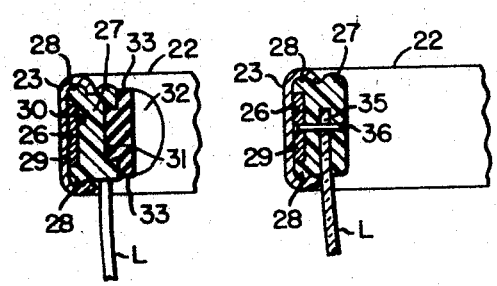
FIG. 4
FIG. 3
INVENTORS
MANUEL M. GITLIN
CHAUNCEY F. LEVY, Jr.
BY P.K. Fitzsimmons
ATTORNEY

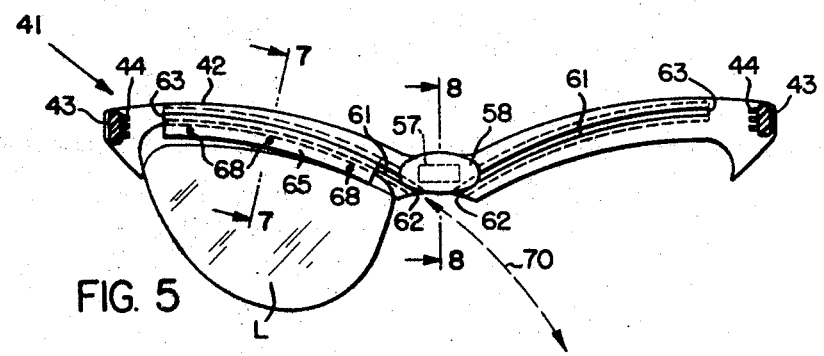
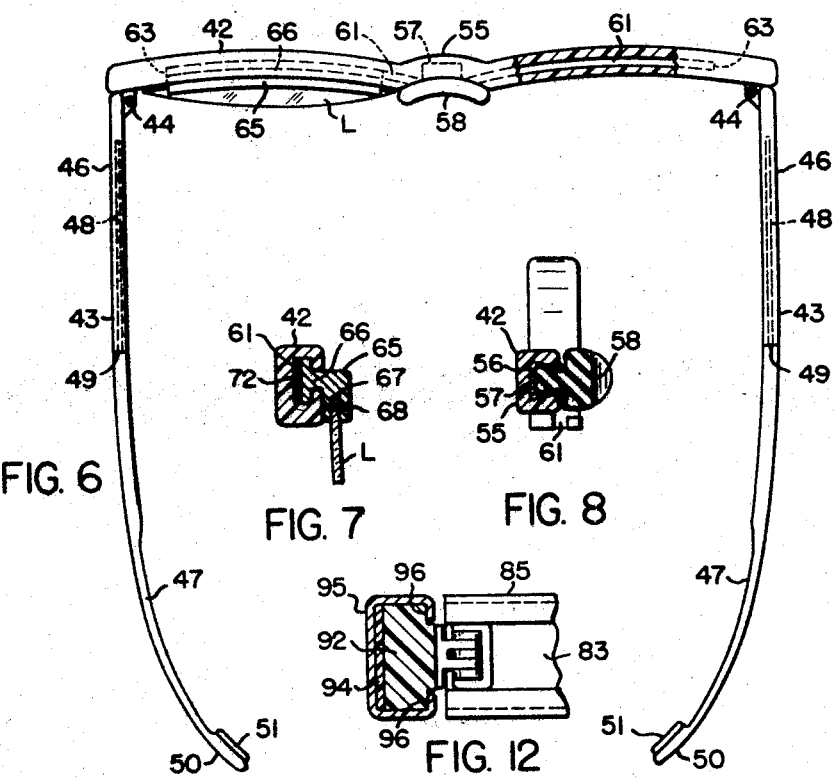
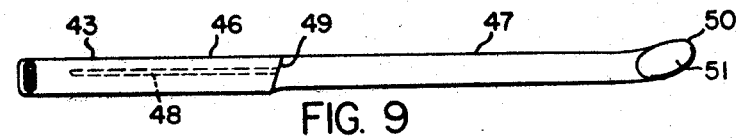
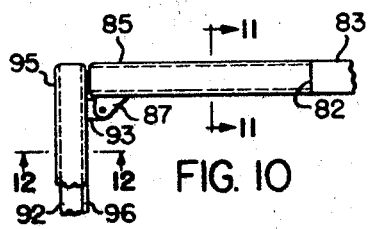
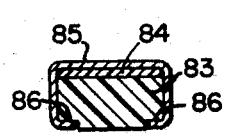

United States Patent Office 3,475,083
Patented Oct. 28, 1969

3,475,083
SPECTACLE FRAME HAVING DETACHABLE
LENSES AND INWARDLY CURVED TEMPLES
Manuel M. Gitlin, 68 Oakdale Drive 14618, and
Chauncey F. Levy, Jr., 39 Wisner Road 14622,
both of Rochester, N.Y.
Filed July 27, 1965, Ser. No. 475,288
Int. Cl. G02c 1/04
U.S. Cl. 351—41                                    5 Claims

ABSTRACT OF THE DISCLOSURE

A spectacle frame has a resilient nose pad removably secured to the rear of its front section, and a pair of temples mounted to extend rearwardly with their free ends curved inwardly to resiliently embrace the posterior of the head of the person wearing the frame. A pair of lenses are suspended from the front section either by a one-piece supporting member, which is removably and frictionally seated in a groove in the front section, or by two members that are removably locked by the nose pad in a pair of arcuate grooves in the front section.

---

The present invention relates to spectacles, and more particularly to improved spectacle frames and lens mounts therefor.

The conventional spectacle frame usually includes a pair of spaced nasal pads for supporting the bridge of the spectacle frame on the nose of the person wearing the spectacles; and the free ends of the spectacle frame temples are usually curved to pass over, and generally downwardly behind the ears of the wearer.

A major disadvantage of this type of frame is that the combined weight of the forward section of the spectacle frame, and the lenses supported thereby, is transmitted substantially vertically downwardly through the nasal pads to the nasal bridge of the person wearing the spectacles, thereby often causing indentation marks to be formed on the nose of the wearer. This problem is particularly acute in the case of cataract patients, and the like, who must wear particularly heavy lenses. Skin irritation and discomforting pain is not uncommon among these people; and in severe cases skin lesions and cancer have resulted from the pressure and slippage of the nasal pads against the flesh of the wearer. Similar difficulties are encountered about the upper ear area due to the weight and slippage of spectacle frame temples, where they engage thin-skinned area of the ear.

It has been found, however, that certain areas of the skull, which lie in the temporal-parietal-occipital area behind and above the ear, are capable of sustaining moderate pressure for extended periods of time without causing any significant feeling of pain or discomfort. It has been found also that the area of the nose, which lies between the lower extremity of the forehead in the upper portion of the nasal bridge, is less sensitive to pressure than the areas of the nose, which are now utilized to support the nasal pads of conventional spectacle frames. It has also been found that the area above the supraorbital ridges are less sensitive and can be used in conjunction with the upper portion of the nasal bridge or above to help support the spectacle frame.

An object of this invention is to provide an improved spectacle frame, which will not unduly irritate the nose and ear areas of the wearer.

Another object of this invention is to provide an improved spectacle frame, which will be fitted to the skull of the wearer by substantially radial forces.

A further object of this invention is to provide a novel spectacle frame having a nose pad and improved temples, which will engage the least sensitive areas of the nose and skull of the wearer to retain the frame thereon.

A more specific object of this invention is to provide an improved spectacle frame having resilient temples, which engage predetermined areas of the skull of the wearer to induce between the frame and the skull substantially radial forces for retaining the frame before the eyes.

An additional object of the invention is to provide an improved spectacle frame and removable lens mounting means therefor, which will considerably ease the mounting and replacement of lenses in the frame.

A still further object of this invention is to provide a novel spectacle frame temple and means for removably securing decorative overlays thereon.

Other objects of the invention will be apparent hereinafter from the specification and from the recital of the appended claims, particularly when read in conjunction with the accompanying drawings.

In the drawings:

FIG. 1 is a plan view of a pair of spectacles and a frame therefor made in accordance with one embodiment of this invention, the head of a person upon whom the spectacles are adapted to be mounted being shown in phantom by broken lines;

FIG. 2 is a side elevational view of these spectacles, and illustrating again in phantom by broken lines the head of a person wearing the spectacles;

FIG. 3 is an enlarged, fragmentary sectional view of the spectacles taken along the line 3—3 in FIG. 1 looking in the direction of the arrows;

FIG. 4 is a fragmentary sectional view of the frame on the same scale as FIG. 3, and taken along the line 4—4 in FIG. 1 looking in the direction of the arrows;

FIG. 5 is a rear elevational view of a modified spectacle frame and lens mount therefor made in accordance with a further embodiment of this invention, parts thereof being shown in section, and, for purposes of clarity, only a single lens being shown mounted on the frame;

FIG. 6 is a plan view of the modified frame, parts thereof being broken away and shown in section;

FIG. 7 is an enlarged sectional view of this frame taken along the line 7—7 in FIG. 5 looking in the direction of the arrows;

FIG. 8 is a sectional view on the same scale as FIG. 7 and taken along the line 8—8 in FIG. 5 looking in the direction of the arrows;

FIG. 9 is a side elevational view of one of the temples, which forms part of the modified frame;

FIG. 10 is a fragmentary plan view of a spectacle frame, which is made in accordance with a still further embodiment of this invention;

FIG. 11 is an enlarged sectional view taken along the line 11—11 in FIG. 10 looking in the direction of the arrows;

FIG. 12 is an enlarged sectional view taken along the line 12—12 in FIG. 10 looking in the direction of the arrows; and FIG. 13 is a fragmentary side elevational view of a modified form of the temple illustrated in FIG. 2.

Instead of conventional nose pads, each of the novel spectacle frames illustrated herein is provided with a single, resilient pad, which is adapted to overlie the front of the supra-orbital ridge; and a pair of temples the free ends of which are adapted resiliently to engage opposite sides of the skull of the wearer rearwardly in the area of the posterior parietal-temporal or occipital area of the skull, where the skull curves sagitally as its contour proceeds posteriorly; and above the level of the mastoid area.

Referring now to the drawings by numerals of reference, and first to the embodiment illustrated in FIGS. 1 to 4 inclusive, the spectacle frame 21 comprises a continuous strip of spring steel, which is bent into a generally U-shaped configuration (FIG. 1) to define a pair of temples 22, which are connected by, and are integral at their front ends with, a transverse front or lens supporting section 23. Adjacent their rear or free ends, the temples 22 taper to a reduced thickness, and curve longitudinally inwardly toward one another resiliently to embrace opposite sides of the skull S (broken lines in FIGS. 1 and 2) of the person wearing the frame. At the free end thereof, each temple 22 has an enlarged, "skull pad" area 24, which is adapted to press radially inwardly against the skull in a manner to be described in more detail below. Medially of its ends the front section 23 is curved slightly as at 25 to form a bridge section 25 to accommodate the nose of the person wearing the frame.

Removably seated in an elongate, shallow groove or recess 26 formed in the inside face of the front section 23 of the frame is a plastic rod, or lens supporting member 27. Adjacent its forward face (the left side thereof in FIGS. 3 and 4) the upper and lower faces, respectively, of the member 27 are provided with resilient, longitudinally extending ribs or bosses 28, which project into corresponding recesses formed in the upper and lower sides, respectively, of the groove 26. Secured in a groove 30 formed in the forward face of the member 27 is a magnet 29, which extends longitudinally of the member 27, and which confronts the bottom of the groove 26 in operative relation to the front section 23 of the frame 21. The magnet 29, and the bosses 28, which are compressed slightly upon being inserted into the groove 26, prevent any undesirable movement of the member 27 relative to the frame 21.

Secured at one end thereof in a recess 31 (FIG. 3) formed in the rear face of the support member 27 substantially midway between the ends thereof is a resilient pad 32. Pad 32 registers with the bridge section 25 of the frame, and may be made of foam rubber or the like. At its opposite end the pad 32 projects rearwardly out of the recess 31, and as shown more clearly in FIG. 1, is curved to conform to the bridge of a person's nose. Also, the upper and lower marginal edges 33 (FIG. 3) of the pad 32 register with the upper and lower edges of the support member 27 to prevent the latter from irritating the nose of the person wearing the glasses.

Projecting at its upper edge into a groove 35 (FIG. 4) formed in the underside of the member 27 adjacent each end thereof is a conventional lens L. Each lens L is secured in its respective groove 35 by a plurality of rivets 36, only one of which is illustrated in FIG. 4. The lenses L are positioned in a conventional manner at opposite sides of the pad 32 to register with the eyes of the person wearing the frame 21.

In use, the temples 22 of the frame 21 are first shaped so that they will fit one's skull S in the manner illustrated in FIGS. 1 and 2. To this end it is necessary that the temples 22 be made somewhat longer than conventional temples, so that when the free ends thereof are curved inwardly toward one another as shown in FIG. 1 to conform to opposite sides of the skull, the skull pads 24 will embrace the posterior arch of the skull with an "ice tong" effect, which will prevent anterior slippage of the frame 21 relative to the skull. When the frame 21 is designed for, and worn by the average male, the arcuate distance separating the free ends of the temples 22, which corresponds in FIG. 1 to the length of the curved surface of the skull S between the pads 24, is approximately four and one-half (4½) inches, as compared to approximately eight (8) inches for conventional frames. Moreover, unlike most conventional temples, which at their free ends are shaped to curve downwardly behind the ears E of the wearer, the temples 22 are substantially coplanar with the frame section 23, except at the terminal ends thereof, where the skull pads 24 may be surved slightly in a vertical direction, either upwardly or downwardly as the case may be (usually slightly upwardly as illustrated in FIG. 2) in order to engage the above-noted insensitive areas of the skull, which are capable of sustaining moderate pressure for extended periods of time without causing any significant pain or discomfort to the wearer of the frame. As illustrated more clearly in FIG. 2, these relatively insensitive areas generally lie above and to the rear of a person's ears, and correspond to points which lie adjacent the intersection of the trailing edges of the parietal and temporal bones at opposite sides of one's skull S. (The parietal and temporal bones of the skull are delineated by broken lines in FIG. 2, and are designated P and T, respectively.)

The temples 22 are shaped to conform to one's skull in the manner above-described, and the portions thereof which extend rearwardly from the person's ears E, which portions approximate substantially the rear half of each temple 22, may be heat treated by radio frequency heating, or other conventional means, to induce spring action in the trailing portions of the temples, so that the skull pads 24 will be urged resiliently inwardly toward the skull S, and radially of the vertical axis of the skull. The radial forces exerted by the skull pads 24 tend to draw the frame 21 rearwardly, as illustrated in FIGS. 1 and 2, so that the pad 32 exerts a corresponding force against the area of the nose, which lies between the lower extremity of the forehead and the upper portion of the nasal bridge. As a result, the frame 21 is retained on one's skull by radial forces, which are transmitted radially of the vertical centerline of the skull at the three spaced points, which register with the two skull pads 24, and the nose pad 32, respectively. Therefore, unlike prior spectacle frames, the bulk of the weight of the lenses L, and the front frame section 23, is not transmitted downwardly onto the more sensitive side sections of the wearer's nose, but is instead transmitted downwardly and rearwardly against the more insensitive, upper end of the nasal bridge.

To facilitate the mounting and removal of frame 21 from one's head, a coating of plastic, such as a fluorocarbon material or the like, may be applied to the resilient, heat treated portions of the temples 22 (substantially the rear halves thereof). By way of example, this material may be applied by utilizing heat-shrinkable fluorocarbon tubing, which may be shrink fitted in a conventional manner onto the temples.

Referring now to FIGS. 5 to 9, inclusive, 41 designates a modified spectacle frame comprising a front, lens supporting section 42, and a pair of temples 43, each of which is hinged in a conventional manner to the rear face of the frame section 42 by hinges 44. Each temple 43 comprises a generally straight, forward section 46, which is connected at one end thereof by one of the hinges 44 to the front frame section 42, and a rear or trailing section 47, which projects rearwardly from the forward section 46. In the embodiment illustrated, each section 46 is made from a plastic material of the type presently employed in certain conventional spectacle frames; and the sections 47 are made of stainless steel, or the like.

Integral with or otherwise secured to the forward end of each metallic temple section 47, and projecting into the rear end of the corresponding plastic temple section 46, is an elongate, metal rod 48, which has a reduced cross sectional area compared to its associated temple section 47. Each rod 48 is press fitted or otherwise secured in a corresponding longitudinal recess formed in the corresponding temple section 46, so that the confronting ends of the sections 46 and 47 in each temple abut one another as shown at 49.

As in the case of the temples 22 in the first embodiment, the temples 43 lie, for major portions of their lengths, in a common plane that extends transverse to the plane containing the front section 42, so that when in use, they extend horizontally rearwardly of the ears of the person wearing the frame 41. Also as in the first embodiment, the temples 43 taper or thin-down adjacent their free ends (the rear ends of sections 47) and curve longitudinally inwardly toward one another. The terminal or free ends of the temple sections 47 are provided with enlarged skull pad areas 50, which curve vertically upwardly relative to the last-named plane to engage the posterior of one's skull in the same manner as pads 24, and to which a resilient pad 51 may be secured if desired.

Intermediate its ends the front section 42 of the frame 41 is provided with the usual bridge section 55, which is curved to accommodate the nasal bridge of the person wearing the frame 41. Removably secured by a metal snap 56 (FIG. 8) in a recess 57 formed in the rear face of the bridge section 55 is a resilient nose pad 58, which is made of padded leather, sponge rubber, or the like. As in the case of the pad 32, the pad 58 is curved longitudinally of its ends to overlie the nasal bridge of the person wearing the spectacle frame.

At opposite sides of the intermediate bridge portion 55 the lens supporting portions of the frame section 42 are curved longitudinally. In its rear face each of these curved, lens supporting portions of the section 42 is provided with a groove 61, which is generally T shaped in cross section (FIG. 7), and which is curved longitudinally to form a segment of a sphere the center of which lies rearwardly of section 42. Each groove 61 curves about a different center or point. The grooves 61 open at their inner ends 62 (FIG. 5) on the bridge section 55 of the frame adjacent opposite sides of the nose pad 58, and are closed at their opposite ends 63 adjacent opposite ends, respectively, of the frame section 42.

Removably mounted on the rear face of the frame section 42 at opposite sides of the bridge section 55 are two, curved, lens supporting members 65, only one of which for purposes of clarity is illustrated in FIGS. 5 and 6. Projecting from the upper edge of each support member 65 is a T-shaped flange 66 (FIG. 7), which is curved spherically to fit slidably into one of the grooves 61 in the rear face of the frame section 42. In its underside each member 65 is provided with a groove 67 (FIG. 7) in which the upper edge of a conventional lens L is secured by means of a plurality of rivets 68.

Each lens L may be inserted or withdrawn from the frame 41 by first removing nose pad 58, then sliding the flange 66 of the lens support member 65 into or out of the open end 62 of one of the grooves 61 in the frame section 42. For instance, the arrows 70 in FIG. 5 illustrate the direction in which the left-hand lens supporting member 65 should be swung in order to insert and withdraw, respectively, the left-hand lens L from the frame 41. The closed end 63 of each groove 61 limits the extent to which the corresponding lens supporting member 65 may be inserted into a respective groove 61, and assists in locating the lenses L so that they will properly register with the eyes of the person wearing the frame 41. After the insertion of the lenses L, the snap 56 carrying the nose pad 58 is reinserted into the recess 57, whereby opposite ends of the nose pad 58 overly the open ends 62 of the grooves 61 to prevent accidental removal of the support members 65 therefrom.

The dimensions of each groove 61 and the cooperating flange 66 on the associated lens support member 65 are designed to create a slight wedging action or press fit between the frame section 42 and each flange 66, when a member 65 is fully seated in its corresponding groove 61, thereby frictionally to secure the section 42 and a respective member 65 one to the other. In addition, when the support members 65 are made of paramagnetic materials, such as steel or the like, an elongate magnet 72 (FIG. 7) may be secured to the frame section 42 at the bottom of each groove 61 to confront the flange 66 on the associated support member 65, thereby to provide additional means for preventing undesirable movement of the members 65 relative to the frame section 42. Instead of using a conventional, rigid magnet, the magnet 72 may be replaced by a compressible, magnetic, foamed liner, which would be compressed by, and which would frictionally engage the confronting flange 66 on the associated member 65. This liner may comprise a standard foamed plastic containing a magnetizable filler or magnetic particles.

While the temples 43 have been described for use in conjunction with a novel lens supporting section of the type designated at 42, it is to be understood that the temples 43 could be used in combination with any conventional front, or lens supporting section of a spectacle frame. In such instance, of course, it would be desirable to replace the pair of standard nose pads in the conventional lens supporting section of the frame with a resilient nose pad of the type designated at 32 or 58. Alternatively, instead of replacing the conventional temples with the temples 43, portions of the conventional temples adjacent the free ends thereof may be removed by simple machine shop techniques, and may be replaced by the ice tong-shaped sections 47 illustrated in FIGS. 6 and 9. In such instance, the remaining, forward sections of the conventional temples (comparable to the sections 46 illustrated in FIGS. 6 and 9) if made of metal would have to be drilled or otherwise machined to provide bores or recesses in the rear ends thereof for accommodating the rods 48 projecting from the sections 47, but if made of plastic, the heating of such conventional temple sections will enable existing, conventional reinforcing rods to be removed, and reinforcing rods 48 to be readily inserted. Moreover, instead of utilizing the reinforcing rods 48, sections 47, without the rods 48, could be spliced in any conventional manner to the trailing ends of the temple sections 46.

FIGS. 10 to 12 illustrate part of a modified frame 81, comprising a front section 92, and a pair of temples 83, only one of which is illustrated in part. Each temple 83 is connected at its forward end to a temporal end of the section 92 by conventional hinge members 87 and 93. An elongate strip of compressible, magnetic tape 84 is secured to the outside face of each temple 83 between the forward end thereof and a shoulder 82 formed on the temple rearwardly of its forward end. A like strip 94 is secured to the outer face of the frame section 92 adjacent each temporal end thereof.

Removably positioned over the forward end of temple 83 is a decorative, metal or plastic overlay 85, which is generally C-shaped in cross section. The inner face of the overlay 85 confronts the tape 84; and its longitudinal side edges engage in parallel grooves 86 formed in the inside face of the temple. A like overlay 95 is removably positioned over each end of the section 92 with its inner face confronting the tape 94, and its longitudinal side edges engaging in grooves 96 formed along the inside or rear face of section 92.

When a temple 83 is folded into its inoperative position parallel to the frame front 92, its overlay 85 may be removed by sliding it off the forward end of the temple, after which a similarly shaped, but differently designed (different color, etc.) overlay may be slid over the forward end of the temple. The overlays 95 may, of course, be changed in a similar manner, and may or may not be similar in color, etc., to those overlays 85 mounted on the temples.

Preferably overlays 85 and 95, and the associated ends of the temples 83 and section 92, respectively, upon which they are mounted, are dimensioned so that there will be a slight wedging action between the overlays and the last-named ends, as the former are slipped onto the latter. The tape 84 and 94, which may be similar to the above-described compressible tape 72, frictionally engages or grips the inside faces of the overlays, and the magnetizable filler therein further secures the overlays against movement, when the overlays comprise a magnetizable material. Also, when the hinged temples 83 are in their operative positions, similar to the positions of the temples 43 in FIG. 5, the temporal ends of section 92 will prevent the overlays from sliding off the temples 83.

Except for the overlays 85 and 95, the temples 83 are generally similar to the temples 43, and the frame section 92 is similar to the frame section 42, i.e., section 92 is adapted to carry removable lens supporting members 65, and a nose pad 58; and the temples 83 are curved intermediate their ends in the manner of the temples 43 illustrated in FIG. 6.

To avoid any irritation of the wearer's ears it may be desirable to offset the trailing or free end of a temple from its hinged end. FIG. 13 illustrates a modified temple 122, which is generally similar to temple 22, except that the temple 122 is provided intermediate its ends with a bend 125 to insure that the trailing portion 126 of the temple will be spaced above, and out of contact with, the ear E of the wearer, when worn.

It is anticipated that the mating surfaces of the groove 61 and flange 66 may have a configuration other than segmental spherical, e.g., any simple or compound arcuate path, curving in horizontal and vertical planes simultaneously, in such manner that the flange 66 follows the same path as the groove 61 in the front frame section 42.

It is preferred that the above-described support members 65 be manufactured so that their grooves 67 come, by way of example, in three different sizes or shapes, thereby to accommodate at least three differently shaped lenses L. Moreover, since the interpupilary distance between the two lenses of a pair of spectacles may differ from person to person, it is anticipated that for a given frame this distance may be reduced by inserting small spacers in the grooves 61 between the closed ends 63 of the grooves 61 and the adjacent ends of the support members 65, or increased by removing these spacers. Moreover, if desired, the frames may be manufactured so that the grooves 61 come, for example, in three different lengths corresponding, respectively to relatively small, medium and large interpupilary distances.

From the foregoing it will be apparent that applicants' novel spectacle frames will prevent undesirable irritation of the wearer's skin in the areas of his or her nose and ears. Applicants' novel frames are provided with improved temples, which grip the posterior of one's skull with an "ice tong" effect, so that the forces that retain the frame on one's skull are transmitted radially inwardly relative to the vertical centerline of the skull at three different points thereabout, whereby the bulk of the weight of the frame is transmitted radial against the nasal bridge and supra-orbital area of the person wearing the spectacle frame. The improved temples 43 or 83 may be substituted in whole or in part for the temples presently employed in conventional frames; or the novel lens supporting section 42 may be utilized in combination with conventional temples. Moreover, applicants' novel frames 21 and 41 permit the ready insertion and withdrawal of the associated lenses and because of their adjustability may be manufactured in a minimum number of different sizes.

It is realized that those skilled in the art may choose to manufacture the novel spectacle frames, by employing roll-forming techniques of metal working, in conjunction with stamping of heavy gauge metal sheet material, such as for example, stainless steel sheeting, to obtain the constructions described according to the embodiments of the invention.

In metal working of extruded metal channeling may be utilized to obtain the desired construction of certain segments of the spectacle frame. Machining of metal plate, or cast plastic sheet may be employed to obtain the desired construction. In addition, the constructional designs may be obtained by cast acrylics, cast epoxies, cast phenolics, cast polyesters, and the like. Injection molding of the thermoplastic and even thermosetting resins may be employed to obtain the various constructional designs described in the various embodiments of the invention. Extruded plastic channeling, such as for example, rigid polyvinyl chloride may be post formed and worked, to produce the desired configurations.

Although the temples described above comprise plastic in conjunction with spring steel, it is realized that temples may be constructed entirely of spring steel, as well as entirely of plastic having adequate resiliency, such as for example rigid polyvinyl chloride, and ABS (acrylonitrile-butadiene-styrene) polymers.

Sunglass lenses may be interchanged with the prescription lenses to further enhance the usefulness of the novel spectacle frames, in accordance with the embodiments of the invention, as herein described.

Having thus described our invention, what we claim is:

1. A spectacle mounting for reading glasses and the like, comprising
    a frame having a front, lens supporting section, and a pair of temples connected to opposite ends, respectively, of said front section,
    means removably mounting a pair of lenses on said front section to extend substantially vertically downwardly therefrom to register with the eyes of the person wearing said frame,
    a resilient pad projecting from the rear of said front section to overlie the nasal bridge of said person,
    said temples having major portions of their lengths lying in a common plane, which extends transverse to a plane containing said front section, and having minor portions of their lengths adjacent the free ends thereof curved slightly out of the first-named plane,
    each of said temples having a resilient surface on the free end thereof, and
    the portions of said temples, which lie rearwardly of approximately the midpoints of said temples, being made of resilient material, and being curved inwardly toward one another, when in use, resiliently to urge said resilient surfaces on the free ends thereof radially inwardly against the posterior of the skull in the temporal-parietal-occipital area above and behind the ears of the person wearing said frame, thereby to induce between the free ends of the temples and the skull substantially radial forces which tend to draw the frame rearwardly on said skull,
    said front section having therein a pair of spaced, elongate, segmental-spherical grooves, which extend longitudinally of said front section at opposite sides, respectively, of said pad,
    said means comprising a pair of members removably seated in said grooves with a press fit, and having portions thereof projecting outwardly from said grooves, and
    a lens secured to each of said projecting portions of said members to be suspended thereby beneath said front section.

2. A spectacle mounting as defined in claim 1, wherein the adjacent ends of said grooves are open and the opposite ends thereof are closed, and
    said resilient pad is removably secured in the rear face of said front member between the open ends of said grooves normally to block removal of said lens supporting members from said grooves.

3. A spectacle mounting as defined in claim 1, wherein said grooves curve intermediate their ends about points spaced from said front section,
    the portion of each of said members, which is seated in one of said grooves, conforms to the curvature of the groove in which it is seated, and
    each of said grooves is open at one end and closed at its other end, whereby each of said members may be removed from the open end of its associated groove by swinging it about one of said points.

4. A spectacle mounting for reading glasses and the like, comprising
    a frame having a front, lens supporting section, and a pair of temples connected to opposite ends, respectively, of said front section, means removably mounting a pair of lenses on said front section to extend substantially vertically downwardly therefrom to register with the eyes of the person wearing said frame, a resilient pad projecting from the rear of said front section to overlie the nasal bridge of said person, said temples having major portions at their lengths lying in a common plane, which extends transverse to a plane containing said front section, and having minor portions of their lengths at the free ends thereof curved slightly out of the first-named plane, the portions of said temples, which lie rearwardly of approximately the midpoints in said temples, being made of resilient material, and being curved inwardly toward one another, when in use, resiliently to urge said minor portions inwardly against the posterior of the skull in the temporal-parietal-occipital area above and behind the ears of the person wearing said frame, thereby to induce between the frame and the skull substantially radial forces for retaining the frame on said skull, said front section having therein a pair of spaced grooves, which extend longitudinally of said front section at opposite sides, respectively, of said pad, said means comprising a pair of members removably seated in said grooves with a press fit, and having portions thereof projecting outwardly from said grooves, a lens secured to each of said projecting portions of said members to be suspended thereby beneath said front section, said grooves curving intermediate their ends about points spaced from said front section, the portion of each of said members, which is seated in one of said grooves, conforming to the curvature of the groove in which it is seated, each of said grooves being open at one end and closed at its other end, whereby each of said members may be removed from the open end of its associated groove by swinging it about one of said points, said open ends of said grooves being disposed adjacent said pad, and means is provided for removably mounting said pad in a recess in the rear of said front section, whereby said pad operatively blocks removal of said members from said grooves, when said pad is secured in said recess.

5. A spectacle mounting for reading glasses and the like, comprising a frame having a front member, and a pair of temples connected to opposite ends of said front member to extend rearwardly therefrom over the ears of the person wearing said frame, said front member having in the rear face thereof a groove which extends longitudinally of said front member, a lens supporting member removably seated in said groove with a press fit, and having a portion thereof projecting out of said groove rearwardly of said front member, a pair of spaced lenses secured to said rearwardly projecting portion of said lens supporting member to be suspended thereby beneath said front member for registry with the eyes of the person wearing said frame, a resilient pad secured in a recess in the rear of said lens supporting members between said lenses, and projecting rearwardly therefrom to register with and engage the upper portion of the nasal bridge of the person wearing the frame, and said temples having thereon resilient surfaces adjacent their free ends and being curved longitudinally inwardly toward one another, when in use, resiliently to urge said resilient surfaces radially inwardly against the posterior of one's skull in the temporal-parietal-occipital area, thereby to induce between the free ends of the temples and the skull substantially radial forces which tend to draw the frame rearwardly on said skull.

References Cited

UNITED STATES PATENTS

| D. 113,882 | 3/1939 | Sanders | 351—41 X |
|---|---|---|---|
| 1,001,238 | 8/1911 | Barnes | 351—111 |
| 1,699,083 | 1/1929 | Stevens et al. | 351—117 |
| 1,794,571 | 3/1931 | Wrighton et al. | 351—121 X |
| 1,819,738 | 8/1931 | Daniels | 351—156 |
| 2,254,746 | 9/1941 | Line | 351—106 |
| 2,384,867 | 9/1945 | Williams | 351—106 X |
| 2,474,856 | 7/1949 | Moseley | 351—121 |
| 2,770,168 | 11/1956 | Tesauro | 351—57 |

FOREIGN PATENTS

| 984,493 | 2/1965 | Great Britain. |
|---|---|---|
| 575,333 | 5/1959 | Canada. |
| 1,347,120 | 11/1963 | France. |
| 1,357,227 | 2/1964 | France. |
| 462,113 | 2/1951 | Italy. |
| 285,411 | 9/1913 | Germany. |

DAVID SCHONBERG, Primary Examiner

J. W. LEONARD, Assistant Examiner

U.S. Cl. X.R.

351—60, 103, 111, 114, 132, 138, 178